US006956065B2

(12) United States Patent
Van Duin et al.

(10) Patent No.: US 6,956,065 B2
(45) Date of Patent: Oct. 18, 2005

(54) METHOD FOR DEVULCANIZING RUBBER WITH AN AMINE

(75) Inventors: Martin Van Duin, Sittard (NL); Jacobus W. M. Noordermeer, Susteren (NL); Miriam A. L. Verbruggen, Zwolle (NL); Leen Van Der Does, Enschede (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/106,796

(22) Filed: Mar. 27, 2002

(65) Prior Publication Data

US 2003/0013776 A1 Jan. 16, 2003

Related U.S. Application Data

(63) Continuation of application No. PCT/NL00/00623, filed on Sep. 5, 2000.

(30) Foreign Application Priority Data

Sep. 28, 1999 (NL) .............................................. 1013155
Apr. 21, 2000 (NL) .............................................. 1015003

(51) Int. Cl.$^7$ ............................................... C08J 11/04
(52) U.S. Cl. ........................ 521/40; 521/40; 521/40.5; 521/42
(58) Field of Search ........................... 521/40, 40.5, 41, 521/42

(56) References Cited

U.S. PATENT DOCUMENTS

| 2,304,550 A | * | 12/1942 | Dasher | 260/720 |
| 2,478,826 A | * | 8/1949 | Johnson et al. | 260/2.3 |
| 4,211,676 A | * | 7/1980 | Watabe et al. | 260/2.3 |
| 5,672,630 A | * | 9/1997 | Mouri et al. | 521/41 |
| 6,077,874 A | * | 6/2000 | Wideman et al. | 521/42.5 |

FOREIGN PATENT DOCUMENTS

| DE | 1244390 | 1/1968 |
| GB | 605588 | 12/1945 |

OTHER PUBLICATIONS

Patent Abstracts of Japan, English Abstract of JP 53–024322, published Sep. 12, 1979.
Furukawa et al., "Properties of old tyre rubber, and various factors that dominate the properties of regenerated rubber", International Polymer Science and Technology, vol. 53, No. 8, 1980, pp. 32–37.

* cited by examiner

Primary Examiner—Katarzyna Wyrozebski
(74) Attorney, Agent, or Firm—Mayer, Brown, Rowe & Maw, LLP

(57) ABSTRACT

The invention relates to a method for devulcanizing a sulphur-cured rubber, which rubber contains a network of a polymer, which polymer has a main chain of carbon atoms, in which for the vulcanization per 40 carbon-carbon bonds in the main chain a maximum of 1 unsaturated carbon-carbon bond occurs, by heating the rubber in the presence of a devulcanizing agent. The devulcanizing agent is an amine compound.

13 Claims, 4 Drawing Sheets

METHOD FOR DEVULCANIZING RUBBER WITH AN AMINE

CROSS-REFERENCE TO RELATED APPLICATIONS

This is a Continuation of International Application No. PCT/NL00/00623 filed Sep. 5, 2000 which designated the U.S. and was published in the English language. The contents of this PCT application are incorporated in their entirety by reference.

The invention relates to a method for devulcanizing a sulphur-cured rubber, which rubber contains a network of a polymer, which polymer has a main chain of carbon atoms, in which for the vulcanization a maximum of 1 unsaturated carbon-carbon bond per 40 carbon-carbon bonds occurs in the main chain, by heating the rubber in the presence of a devulcanizing agent.

The polymer in rubber generally consists of two or more monomer units. Depending on the monomers used in the polymerization process of the polymer, a polymer is formed with a main chain on which side groups or side chains can be present. It is possible that unsaturated carbon-carbon bonds occur in the polymer in the main chains, the side groups and the side chains. In addition to the polymer for example fillers, oils, reinforcing agents and coloring agents are used in rubber.

To obtain the properties of the rubber after shaping into a rubber article it is usual that rubber is vulcanized. Sulphur compounds are commonly used as vulcanizing agents. During the vulcanization of the rubber the sulphur compounds react mainly with the carbon atoms located next to the unsaturated carbon-carbon bonds in the main chain, the side groups or the side chains of the polymer, whereupon the unsaturated bonds disappear and a polymer network with sulphur bridges between the polymer chains is formed.

To be able to reuse the rubber it is necessary to devulcanize the rubber. In this process the sulphur bridges are broken, so that once again an unvulcanized rubber is formed, which can then again be shaped into an article and again can be vulcanized.

Such a method is known from the IRC 1998 Conference Proceedings, Société de Chimie Industrielle, $12^{th}$–$14^{th}$ May 1998, pp. 289–290. Here a method is described for devulcanization of rubber with polymers that have more or less than 1 unsaturated carbon-carbon bond per 40 carbon-carbon bonds in the main chain. If the polymer in the rubber contains more than 1 unsaturated carbon-carbon bond per 40 carbon-carbon bonds in the main chain, as is the case with for example natural rubber, then the devulcanization is usually carried out at 200° C. with an aromatic disulphide, such as diphenyldisulphide, as the devulcanizing agent. However, if the polymer in the rubber has a main chain, in which a maximum of 1 unsaturated carbon-carbon bond occurs in the main chain per 40 carbon-carbon bonds, as is the case in for example EPDM rubbers, then the temperature during the devulcanization process must be increased to +/−275° C. and the devulcanization lasts longer. A disadvantage of this method is then that in both cases a mixture of divergent devulcanization products is formed, which can be revulcanized only with difficulty or not at all, or on revulcanization gives a rubber with inferior properties.

Figure 1:
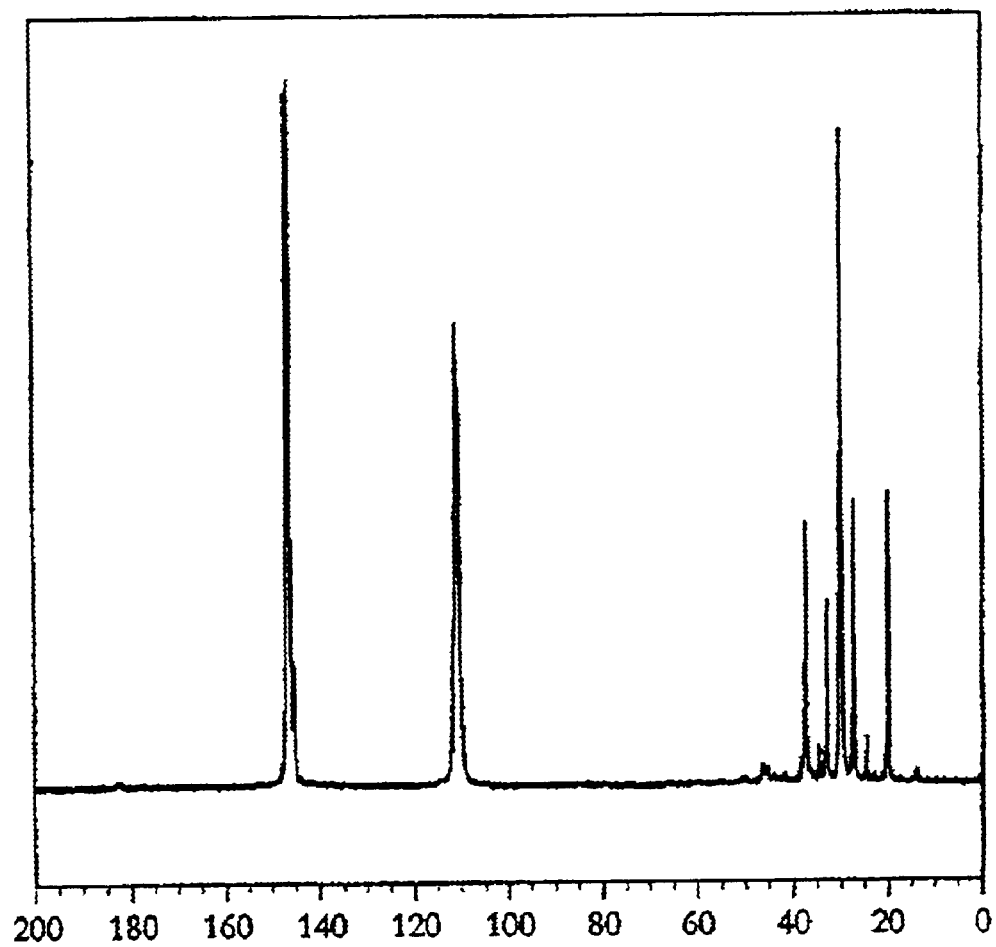
FIG. 1 is a $^{13}$C NMR spectrum of an EPDM polymer in accordance with Comparative Experiment A.

The object of the invention is to provide a method for devulcanizing a sulphur-cured rubber, which rubber contains a network of a polymer, which polymer has a main chain of carbon atoms, in which for the vulcanization a maximum of 1 unsaturated carbon-carbon bond occurs per 40 carbon-carbon bonds in the main chain, by heating the rubber in the presence of a devulcanizing agent, which method does not have the disadvantages.

This object is achieved in that in the case of the method according to the invention the devulcanizing agent is an amine compound.

It has been found that when the method according to the invention is applied a devulcanization product is formed that is very suitable for revulcanization and once again a rubber is produced which has good properties. The method according to the invention is particularly suitable for use in the when devulcanization of sulphur-cured rubber, which rubber contains a polymer with few unsaturated carbon-carbon bonds in the main chain.

Further it is known from the "Rubber Technology Handbook, W. Hofmann, page 320, Hanser Publishers, Munich/New York, 1996" that devulcanization of sulphur-cured rubber, such as for example natural rubber, can also be carried out without devulcanizing agents at an elevated temperature. With this method the devulcanization of the rubber is incomplete. In addition, the use of devulcanizing agents for the devulcanization of rubber has been described, such as thiophenols and disulphide for the devulcanization of sulphur-cured rubbers at a temperature of 200–250° C. A disadvantage is that only a part of the sulphur crosslinks between the main chain of the rubber polymers is broken. Another disadvantage of this method is that also scission of the main chain occurs. Still another disadvantage is that also other unwanted secondary reactions take place, such as forming cyclic compounds.

Examples of amine compounds that are suitable to be used in the method according to the invention are primary, secondary and tertiary amines, where one or more aliphatic and/or aromatic groups are bound to the nitrogen atom of the amine compound. It is possible that the aliphatic and/or aromatic groups contain substitutes.

Preference with the method for devulcanizing sulphur-cured rubber according to the invention exists for the use of an amine compound that contains an α-C atom with at least one H atom:

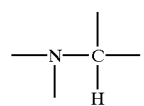

Special preference with the method for devulcanizing sulphur-cured rubber according to the invention exists is for the use of octylamine, hexadecylamine, dioctylamine, trioctylamine, benzylamine or 4-piperidinopiperidine.

The quantity of amine compound, that is used as devulcanizing agent, amounts to for example between 0,1–15 weight % in respect of the quantity of rubber. Preferably the quantity of devulcanizing agent amounts to between 0,5–10 weight % in respect of the quantity of rubber. Special preference is for the method according to the invention where the quantity of devulcanizing agent amounts to 1–6 weight % in respect of the quantity of rubber.

Examples of rubbers that are suitable to be used in the method according to the invention are: butyl rubber (IIR) a polymer of isobutene and a maximum of 5 mole % isoprene, chlorobutyl rubber (CIIR) and bromobutyl rubber (BIIR).

Preferably the method according to the invention is used for devulcanizing a sulphur-cured rubber, which rubber contains a network of a polymer, which polymer has a main chain of preferably carbon atoms, in which for the vulcanization per 200 carbon-carbon bonds in the main chain a maximum of 1 unsaturated carbon-carbon bond occurs. Still more preferably with the method according to the invention there is for the application when devulcanizing a sulphur-cured rubber, which rubber contains a network of a polymer, which polymer has a main chain of carbon atoms, in which for the vulcanization per 1,000 carbon-carbon bonds in the main chain a maximum of 1 unsaturated carbon-carbon bond occurs.

The greatest preference is for the application of the method for devulcanizing a sulphur-cured rubber, which rubber contains a network of polymer, which polymer is a polymer of ethylene, a-olefin and at least one non-conjugated diene monomer. In the polymer the weight ratio between the ethylene and the α-olefin for example lies between the 90/10 and 20/80. preferably the weight ratio in the polymer between the ethylene and the α-olefin lies between the 70/30 and 40/60. The content in the polymer of the total quantity non-conjugated diene monomer lies for example between the 1–20 weight %. Preferably the quantity of non-conjugated diene monomer in the polymer is between 2–12 weight %.

Preferably the α-olefin is propene, and there is one third non-conjugated diene monomer in the polymer, so that the rubber is a polymer of ethylene, propene and a third monomer (EPDM). Special preference is for the application of the method according to the invention where the third monomer in the EPDM polymer is 5-ethylidene-2-norborneene, vinylnorbornene, dicyclopentadiene, methylnorbornene or 1,4 hexadiene.

It is possible to carry out the devulcanization of sulphur-cured rubber in the equipment known in the literature for the processing of rubber and polymers. Examples of suitable equipment are a press, a furnace, a kneader, an autoclave or an extruder. With the method for devulcanizing sulphur-cured rubber according to the invention the rubber is heated with the devulcanizing agent in a suitable apparatus. Preferably the sulphur-cured rubber is heated during devulcanization with the devulcanizing agent to a temperature between 200–350° C. There is special preference for devulcanization where the sulphur-cured rubber is heated with the devulcanizing agent to a temperature between 250–350° C.

It is possible to carry out the method for devulcanizing sulphur-cured rubber according to the invention at normal atmospheric pressure or at an elevated temperature in for example a press or an extruder. Preferably the method for devulcanization according to the invention is carried out at a pressure between 5–10 MPa.

To avoid unwanted secondary reactions when devulcanizing sulphur-cured rubber according to the invention the devulcanization of the sulphur-cured rubber is preferably carried out in an atmosphere from which oxygen has been removed.

The invention is further explained on the basis of the following examples and comparative examples without being limited to them.

The crosslink density of the rubber has been determined as a measure of the number of sulphur bridges present in the rubber by allowing the rubber to swell in a suitable solvent, for example Dekalin. From the absorbed quantity of solvent in a particular quantity of rubber the volume fraction $v_r$ of the polymer in the the swollen sample is calculated. De crosslink density $v_e$ is calculated with the Flory-Rehner equation:

$$v_e = \frac{\ln(1 - v_r) + v_r + \chi \cdot v_r^2}{V_s \cdot (0.5 v_r - v_r^{1/3})}$$

with $v_e$: crosslink density $v_r$: volume fraction of polymer in swollen sample $\chi$: Flory-Huggins interaction parameter $V_s$: molar volume of the solvent.

The crosslink density $v_{e1}$ of the sulphur-cured rubber is measured before the devulcanization. The crosslink density $v_{e1}$ of the sulphur-cured rubber is also measured after the devulcanization. From this the relative decrease of the crosslink density due to the devulcanization can be calculated: $(v_{e1} - v_{e2})/v_{e1}$.

The relative decrease of the crosslink density is a measure of the effectiveness of the devulcanization.

In addition $^{13}C$ NMR spectra have been made of the vulcanized rubber before and after devulcanization to assess the change in the composition of the rubber due to the devulcanization.

Comparative Experiment A

The following rubber composition with the following components was made, where the quantities have been expressed in PHR, the number of weight parts per 100 parts polymer:

|  |  |  | Quantity (PHR) |
|---|---|---|---|
| EPDM polymer | Keltan (r) 4,802 (49 wt. % ethylene, 4, 5 wt. % ENB) | DSM | 100 |
| Zinc oxide | purity >99% | Merck | 5 |
| Stearic acid | purity >97% | Merck | 1.0 |
| Sulphur |  | Merck | 1.5 |
| Tetramethyl-Thiuramdisulphide | Perkacit TMTD-C | Flexsys | 1.0 |
| Mercapto-benzothiazole | Perkacit TMTD-C | Flexsys | 0.5 |

The used ENB in the EPDM polymer is labelled with 13C. The 13C NMR spectrum of this EPDM polymer is given in FIG. 1.

In a high pressure vulcanization press the composition is vulcanized at a temperature of 160° C., a pressure of 7,6 MPa for 15 minutes, where pieces of vulcanized rubber of (20×20×0,2) mm are made. The crosslink density of the sulphur-cured rubber was:

$v_{e1} = 3{,}08 \cdot 10^{-4}$ mol/cm$^3$.

The Flory-Huggins interaction parameter for EPDM in Dekalin $\chi = 0{,}121 + 0{,}278\, v_r$.

Figure 2:
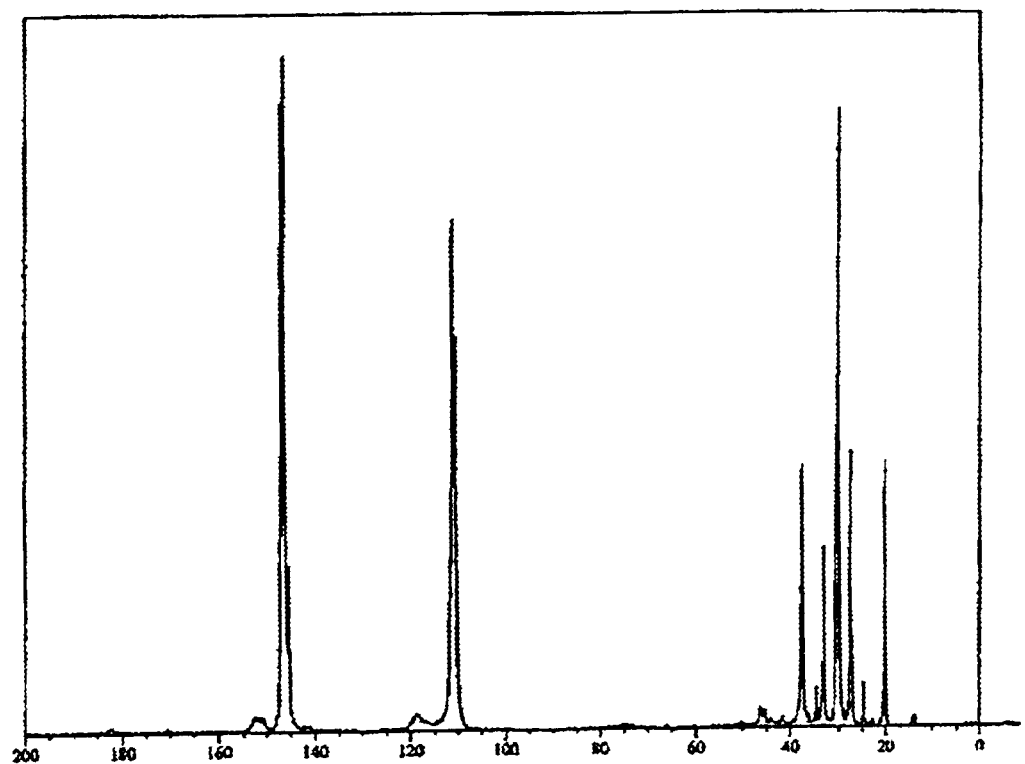
FIG. 2 is a $^{13}$C NMR spectrum of a sulfur-cured EPDM polymer in accordance with Comparative Experiment A.

The $^{13}C$ NMR spectrum of the sulphur-cured EPDM polymer is given in FIG. 2.

The devulcanization of the sulphur-cured pieces of rubber was carried out for 2 hours in a high pressure press at 267° C. and a pressure of 7,6 MPa in a nitrogen atmosphere, where there was no devulcanizing agent present.

The crosslink density of the devulcanized rubber E is measured and the relative decrease of the crosslink density is calculated: $(v_{e1}-v_{e2})/v_{e1}$. The result of comparative experiment A is in table 1.

in the presence of 28 weight % dibenzyldisulphide in respect of the quantity of rubber, under the same devulcanization circumstances as for the devulcanization of comparative experiment A.

Figure 4:
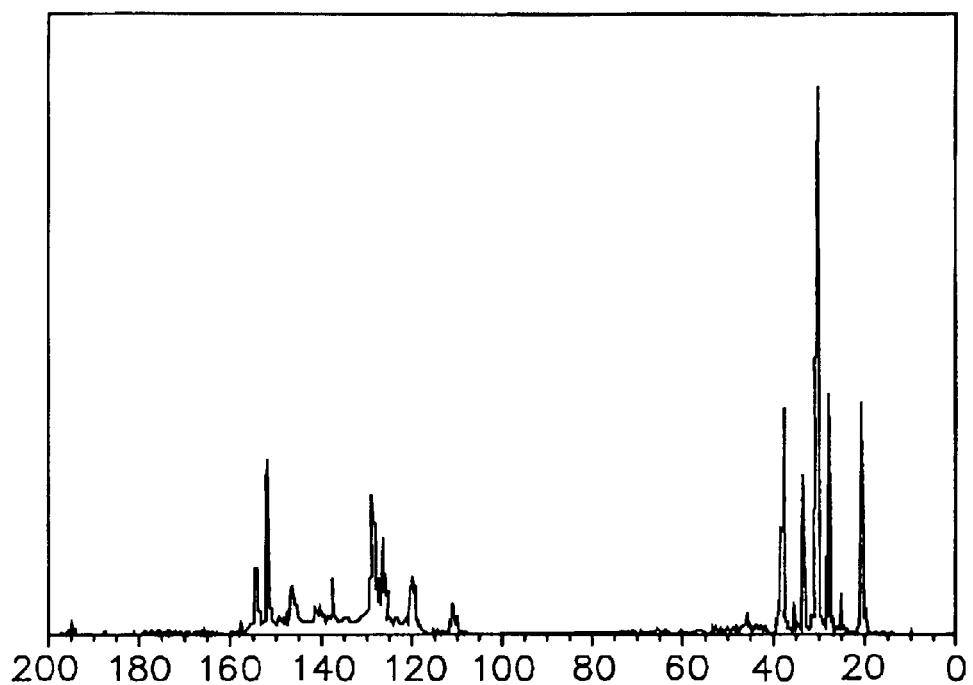
FIG. 4 is a $^{13}$C NMR spectrum of the devulcanization product of a sulphur-cured EPDM rubber in accordance with Comparative Experiment D.

The 13C NMR spectrum of the devucanization product of sulphur-cured EPDM rubber, where the devulcanization has been carried out in the presence of dibenzyldisulphide is given in FIG. 4.

TABLE 1

Relative decrease of the crosslink density of sulphur-cured EPDM rubber with different devulcanizing agents.

| Example/Comparative experiment | devulcanizing agent | Quantity devulcanization means weight % | Concentration devulcanization means (mole per g EPDM) | relative decrease crosslink-density |
|---|---|---|---|---|
| A | — | — | — | 0.39 |
| I | octylamine | 1.8 | $1.4 \times 10^{-4}$ | 0.52 |
| II | D-octylamine | 3.8 | $1.6 \times 10^{-4}$ | 0.72 |
| III | D-octylamine | 5.3 | $2.2 \times 10^{-4}$ | 0.81 |
| IV | tri-octylamine | 5.3 | $1.5 \times 10^{-4}$ | 0.67 |
| V | hexadecylamine | 3.1 | $1.3 \times 10^{-4}$ | 0.62 |
| VI | hexadecylamine | 6.0 | $2.5 \times 10^{-4}$ | 0.82 |
| VII | benzylamine | 1.9 | $1.8 \times 10^{-4}$ | 0.69 |
| VIII | 4-piperidinopiperidine | 1.8 | $1.1 \times 10^{-4}$ | 0.64 |
| B | dibenzyldisulphide | 3.0 | $1.2 \times 10^{-4}$ | 0.58 |
| C | dibenzyldisulphide | 6.0 | $2.4 \times 10^{-4}$ | 0.76 |

EXAMPLES I–VIII

The devulcanization of the sulphur-cured rubber, made according to comparative experiment A. is carried out now in the presence of dibenzyldisulphide or an amine compound devulcanization agent in the amount shown in table 1 in respect of the quantity of rubber, under the same devulcanization conditions as for the devulcanization of comparative experiment A.

The crosslink density of the devulcanized product is measured and the relative decrease of the crosslink density is calculated: $(v_{e1}-v_{e2})/v_{e1}$.

Figure 3:
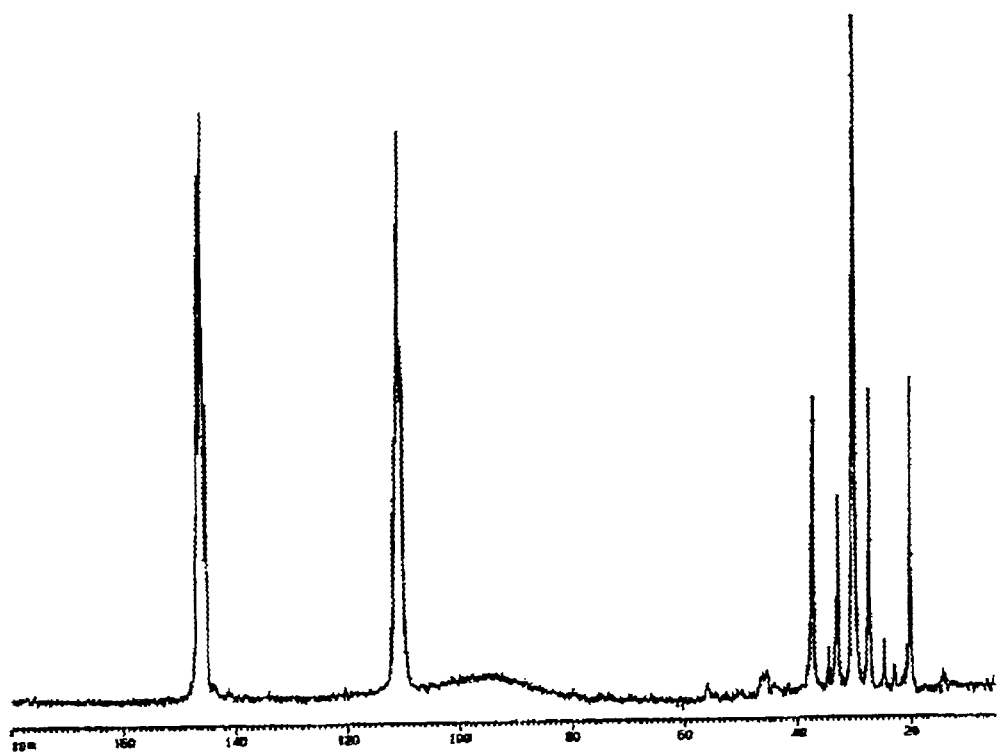
FIG. 3 is a $^{13}$C NNR spectrum of the devulcanization product of a sulphur-cured EPDM rubber according to an embodiment of the invention according to Examples I–VIII.

The results have been stated in table 1 The 13C NMR spectrum of the devucanization product of sulphur-cured EPDM rubber, where the devulcanization is carried out in the presence of hexadecylamine, example V, is given in FIG. 3.

Comparative Experiment B and C

The devulcanization of the sulphur-cured rubber, made according to comparative experiment A, is carried out now in the presence of 3 or 6 weight % dibenzyldisulphide in respect of the quantity of rubber, under the same devulcanization circumstances as for the devulcanization of comparative experiment A.

The crosslink density of the devulcanized product is measured and the relative decrease of the crosslink density is calculated:

$(v_{e1}-v_{e2})/v_{e1}$.

The results have been stated in table 1.

Comparative Experiment D

The devulcanization of the sulphur-cured rubber, made according to comparative experiment A, is carried out now From the relative decrease of the crosslink density of the sulphur-cured EPDM rubber it appears that the effectiveness of the amine compounds as devulcanizing agents for the devulcanization is at least just as good, and often even better, than the usual dibenzyldisulphide devulcanizing agents.

The 13C NMR spectrum of EPDM polymer, FIG. 1, shows at 110 and 146 PPM two peaks, which are derived from the virgin ENB groups in the EPDM.

The 13C NMR spectrum of sulphur-cured EPDM rubber, FIG. 2, shows at 118 and 152 PPM two extra peaks, which are derived from sulphur-cured ENB groups in the EPDM rubber.

In the 13C NMR spectrum of the devucanization product of sulphur-cured EPDM rubber, where the devulcanization has been carried out in the presence of hexadecylamine, FIG. 3, the two extra peaks at 118 and 152 PPM have disappeared again. This means that the ENB groups in the EPDM devulcanized in the presence of hexadecylamine is free of sulphur bridges and the unsaturated carbon-carbon bonds again become available to be vulcanized again.

In the 13C NMR spectrum of the devucanization product of sulphur-cured EPDM rubber, where the devulcanization has been carried out in the presence of dibenzyldisulphide, FIG. 4, in the range between 110–160 PPM a number of peaks can be seen. An important difference is that the peaks of the ENB groups in the EPDM at 110 and 146 PPM have almost disappeared. This means that there are scarcely any or no ENB groups in the EPDM available to be vulcanized again.

What is claimed is:

1. Method for devulcanizing a sulphur-cured rubber, which rubber contains a network of a polymer, which polymer has a main chain of carbon atoms, in which for the vulcanization per 40 carbon-carbon bonds in the main chain a maximum of 1 unsaturated carbon-carbon bond occurs, said process comprising heating the rubber in the presence of a devulcanizing agent wherein the devulcanizing agent consists of an amine compound selected from the group consisting of octylamine, hexadecylamine, dioctylamine, trioctylamine, benzylamine and 4-piperidinopiperidine.

2. Method according to claim 1, wherein the quantity of devulcanizing agent is 0.5–10 weight % in respect of the quantity of rubber.

3. Method according to claim 2, wherein the quantity of devulcanizing agent is 1–6 weight % in respect of the quantity of rubber.

4. Method according to claim 1, wherein the rubber contains a polymer with a main chain in which per 200 carbon-carbon bonds in the main chain a maximum of 1 unsaturated carbon-carbon bond occurs.

5. Method according to claim 4, wherein the rubber contains a polymer with a main chain in which per 1000 carbon-carbon bonds in the main chain a maximum of 1 unsaturated carbon-carbon bond occurs.

6. Method according to claim 1, wherein the rubber is a polymer of ethylene, an α-olefin and at least one non-conjugated diene monomer.

7. Method according to claim 6, wherein the rubber contains an EPDM polymer.

8. Method according to claim 7, wherein the third monomer in the EPDM polymer is 5-ethylidene-2-norbornene, vinylnorbornene, dicyclopentadiene, methylnorbornene or 1,4 hexadiene.

9. Method according to claim 1, wherein the sulphur-cured rubber is heated during devulcanization to a temperature between 200–350° C.

10. Method according to claim 8, wherein the sulphur-cured rubber is heated during devulcanization to a temperature between 250–350° C.

11. Method for devulcanizing a sulphur-cured rubber, which rubber contains a network of a polymer, which polymer has a main chain of carbon atoms, in which for the vulcanization per 40 carbon-carbon bonds in the main chain a maximum of 1 unsaturated carbon-carbon bond occurs, said process comprising heating the rubber in the presence of a devulcanizing agent wherein the devulcanizing agent is an amine compound and wherein devulcanizing the sulphur-cured rubber is carried out at a pressure between 5–10 MPa.

12. Method according to claim 1, wherein devulcanizing the sulphur-cured rubber is carried out in an atmosphere from which the oxygen has been removed.

13. Method according to claim 11 wherein the amine compound is octylamine, hexadecylamine, dioctylamine, trioctylamine, benzylamine or 4-piperidinopiperidine.

* * * * *